Jan. 2, 1951  D. B. VINCENT  2,536,240
CITRUS PULP FOODSTUFF
Filed March 29, 1949  2 Sheets-Sheet 1
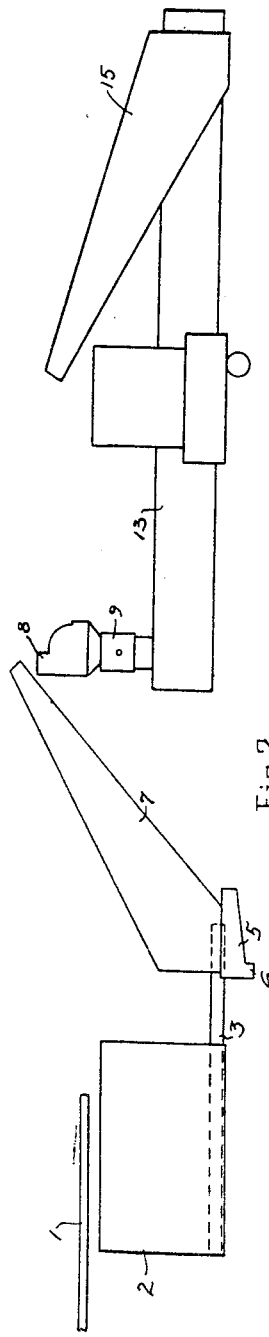
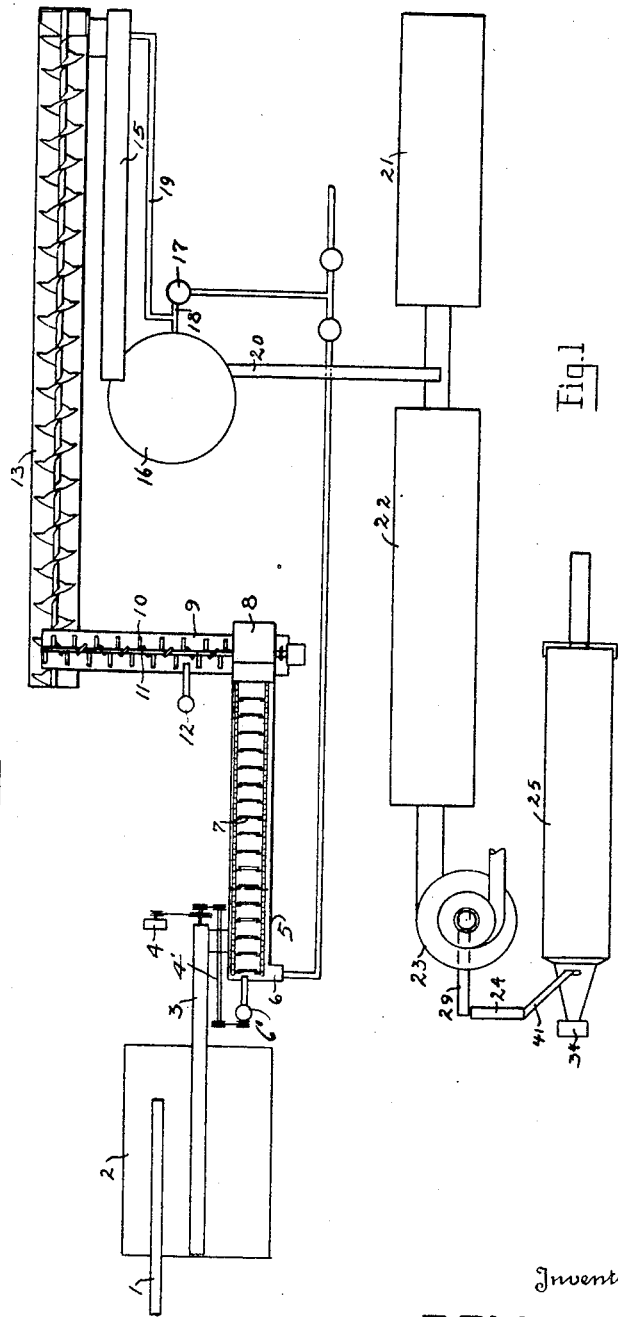
Fig.1
Fig.2
Inventor
D.B.Vincent
By Parry S Miller
his Attorney Jan. 2, 1951  D. B. VINCENT  2,536,240
CITRUS PULP FOODSTUFF
Filed March 29, 1949  2 Sheets-Sheet 2
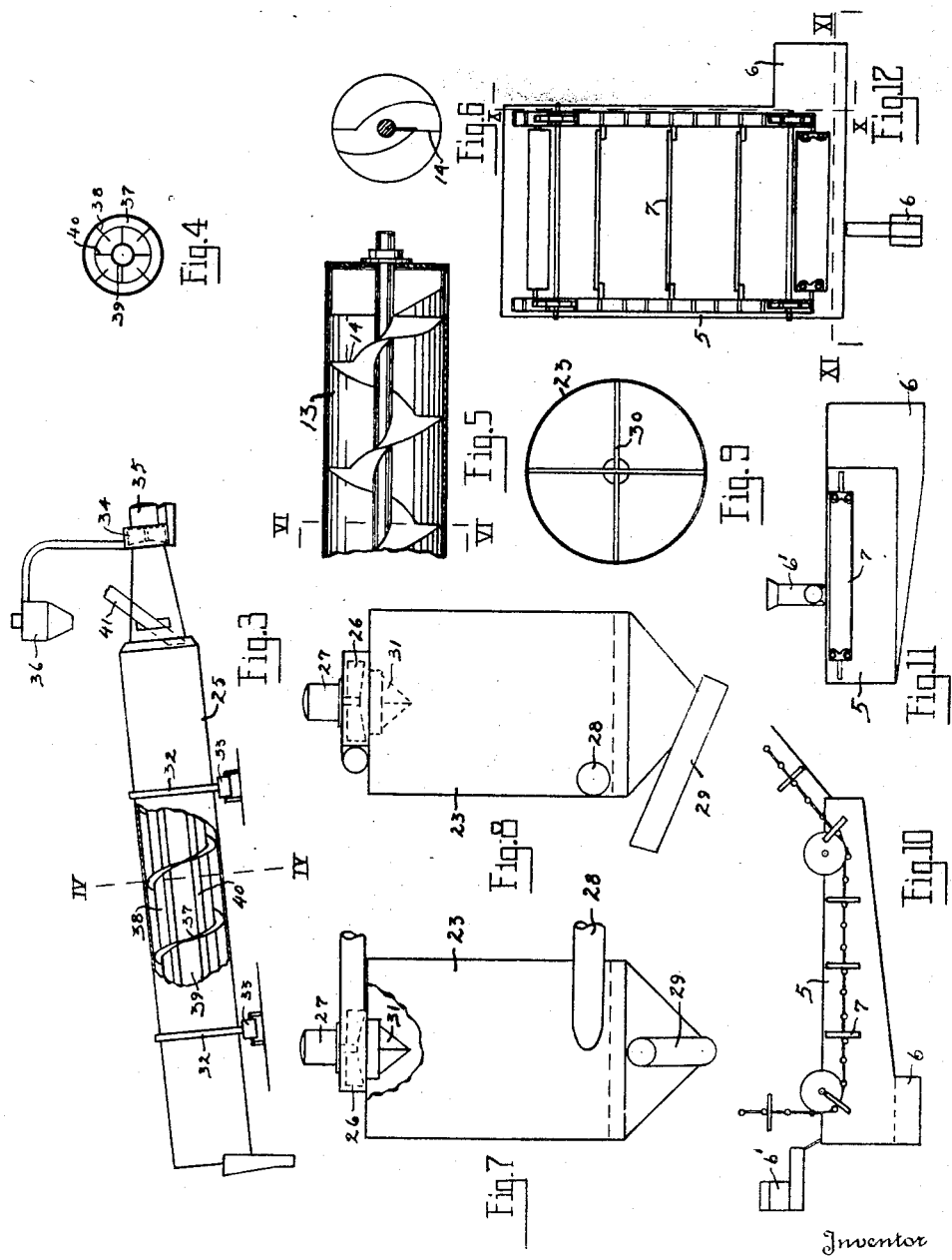
Inventor
D.B.Vincent
By Parry & Miller
His Attorney Patented Jan. 2, 1951

2,536,240

UNITED STATES PATENT OFFICE 2,536,240

CITRUS PULP FOODSTUFF

Daniel B. Vincent, Tampa, Fla., assignor to Dan B. Vincent, Inc., Tampa, Fla., a corporation of Florida Application March 29, 1949, Serial No. 84,182

6 Claims. (Cl. 99—2)

The present invention relates to a citrus pulp foodstuff, and more particularly to a chemically treated, de-watered cattle feed possessing superior dietary properties and especially suitable for use as dairy cattle feed.

A primary object of the invention is the provision of an improved spongy feed of substantially uniform consistency, of increased bulk, light weight, bright color and high water absorbency with a minimum of hard pieces, fine particles and dust.

Citrus cannery waste when shredded and dehydrated to approximately a 10 percent moisture content has long been known to provide a desirable stock and cattle feed. Citrus cannery waste, which includes the peel, rag and seed, when shredded or comminuted, is an unpressable slimy mass comprising approximately 80 to 85 percent water and pulpy solids containing pectin, citric acid and glucosides in addition to proteinaceous solids. In order to economically dehydrate the shredded waste to an approximate 10 percent moisture content, in which condition it may be stored without decomposition, it is desirable to remove a substantial amount of the water from the waste by mechanical means, for example by pressing. As the slimy shredded citrus mass is not water pressable, the generally universally practiced method has been to chemically treat the waste with an alkaline compound, for example a non-toxic calcium compound, to convert the slimy waste into a watery mother liquor and pressable pulpy solids. One prior process for treating citrus cannery waste, which has been extensively practiced in this country, is disclosed in my prior Patent No. 2,215,944, dated September 24, 1940, and reissued as No. 22,865, dated April 8, 1947. Lime or calcium hydroxide is the preferred alkaline compound generally used as a chemical treating reagent.

Such citrus pulp stock feeds as are made from citrus cannery waste by prior processes, as for example as disclosed in my prior Reissue Patent No. 22,865, have contained substantial amounts of insoluble compounds of calcium and pectin, (which I will call as a class, for brevity,) calcium pectate, which, when once dehydrated, will not reabsorb water. The calcium pectate present in prior feeds has been in substantial quantities frequently as high as 20 percent of the bulk.

Heretofore, in processing citrus cannery waste into a stock feed, it has been the practice in chemically treating the waste to render it water pressable, to add dry lime to the waste in sufficient controlled amounts to form a transient gel or to add a concentrated slurry of lime to the waste as it is being shredded which, when allowed to age for a sufficiently long period, renders the waste water pressable.

When lime is added to citrus waste, three reactions takes place: first and most quickly, the formation of calcium citrate by reaction between the lime and the free acid in the water or juices; second, the formation of a gel by reaction between the lime and the glucosides in the peel; and third, the formation of insoluble compounds of calcium and pectin by reaction between the lime and pectins in the solids.

The first reaction is desirable as preventing corrosive action of the citric acid on the metals of the machinery and as eliminating a substance subject to deterioration and not desired in the finished product.

The second reaction is also desirable in removing the bitter flavors and the gels which would otherwise interfere with pressing and drying.

The third reaction is undesirable because the insoluble compound of calcium and pectin, such as calcium pectate, is a hard, brittle substance, and when once dehydrated will not reabsorb water to any appreciable extent. I have found that the formation of this water-insoluble compound of calcium and pectins takes place as the result of an excessively alkaline reaction of the lime with the pectins of the ground peel. Apparently it also takes place as the result of action of the enzymes in the waste material on the pectins where a substantial ageing period is permitted between the chemical treatment and subsequent pressing operation. The production of calcium pectate should be held to a minimum, yet in some previous treatments, the brittle pieces and non-water-absorbing particles of calcium pectate sometimes constitute 20 percent of the product.

In one prior process, for example as disclosed in my above mentioned reissue patent, the citrus cannery waste was first ground or shredded and the alkaline material, such as lime, was added thereto in sufficient amounts to form a transient gel as the citrus mass and alkaline reagent were mixed in a mixing conveyor. Thus the full strength of the alkaline material could react upon some of the exposed pectins of the ground or shredded waste and substantial amounts of water-insoluble pectins were converted into insoluble compounds of calcium and pectins which, when once dehydrated, would not reabsorb water.

In another prior treatment of the citrus waste, the peel from the cannery was dumped on a concrete platform, then fed by hand-operated shovels to an elevator leading to a hammer mill where the peel was ground and crushed and passed on to a pug mill. In the hammer mill a slurry of lime was added, the attempt being made to control the quantity for proper action. However, control is hard to maintain at that point because a hammer mill does very little, if any, mixing and the waste varies so greatly in acidity and in glucoside content, that the proper amount of lime needed cannot be accurately determined until the color change and the formation of the transient gel has taken place in the pug mill after the waste has passed the place where the lime is added. Over-neutralized and under-neutralized portions become mixed in the pug mill in an approach to proper operative conditions, but some parts are permanently damaged.

In still another method, the waste is ground and lime is added to the ground waste in a screw conveyor by which the material is carried to a storage bin. Some mixing occurs in the conveyor but actually, over-limed and under-limed batches reach the storage bin where they lie intermingled. Seepage of liquid from both sorts causes a certain balance in which the lime content may be too much or too little according to the nature of the waste, which is variable. The solids pack in the bin from which they must be dug out by hand tools, this being a hard and costly job, with great variation in the length of time spent in the bin by different portions of the material. In commercial practice such storage bin methods have produced substantial amounts of calcium pectate in the peel, which I believe may be the result of long reaction of calcium with the pectins.

It will be seen that such prior methods produce large quantities of the brittle calcium pectate because the mixing of the lime with the ground waste is not uniform and because there is no control of the period of reaction in the different concentrations. The citrus pulp feeds of such prior methods generally weighed approximately 21 pounds per cubic foot and had a water absorbency of 3.4 pounds of water per pound of feed.

In my copending parent application Serial No. 631,072, filed November 27, 1945, now Patent No. 2,471,363, dated May 24, 1949, of which this application is a continuation-in-part, there is disclosed a preferred embodiment of a method and apparatus for processing citrus cannery waste to produce a chemically treated, de-watered citrus pulp feed having a greater bulk and higher water absorbency than prior feeds, and one which is substantially free from insoluble compounds of calcium and pectin, for example calcium pectate.

According to a preferred process for making the improved product, lime is added to the waste in the form of an aqueous solution before it is shredded, in sufficient quantity to neutralize the free acid in the water, and to thoroughly coat each particle of the waste with a thin coating of a very weak lime water solution, and to neutralize new acid released during the shredding operation quickly after it is released from the peel, but having substantially no free lime in the neutralized mass.

Disintegration of the waste is preferably a shredding operation, rather than grinding or crushing. The long shreds with cut smooth surfaces permit better contact with the liquid during the chemical treatment and present a more open mass to the gases during the drying stages to yield a final product of more desirable texture.

In the event that all of the lime in the water is used up, during the shredding operation, as the acids in the peel continue to be liberated, without achieving the desired alkalinity for gel formation, such as that described in my above mentioned patent, an additional amount of lime may be added to the shredded waste in the mixing trough and rapidly mixed therewith to the extent necessary to form a desired transient gel. When such additional lime is required, it may be added in a smaller amount in a weak liquid condition and thus may be more accurately controlled to agree with the exact requirements of the material than at the gel stage in the mixing trough. The rapid mixing of the lime with the free acids and glucosides in the waste causes quick union of lime, acids and glucosides, leaving insufficient raw lime in the delay conveyor to attack the pectins remaining in the solid portions of the waste.

Breaking of the gel by slow reacidulation caused by acid remaining in the larger pieces of the peel is provided for by a slow movement through a delay conveyor, after which a watery liquid of a slight acidity is strained and pressed from the spongy pulp, which then is acted upon by driers. Drying is advantageously in a subatmospheric current of products of combustion. The waste is in substantially continuous movement from the time it enters the primary liming tank until it is ready for the bags in which it is placed after leaving the cooler.

A preferred type of organized apparatus is diagrammatically illustrated in the accompanying drawings wherein—

Fig. 1 is a plan view of the entire assembly of mechanisms used to treat the waste;

Fig. 2 is a side elevation of the mechanisms shown in the upper portion of Fig. 1 for operations prior to the drying stages;

Fig. 3 is a side elevation of the cooling drum;

Fig. 4 is a transverse section through the drum of Fig. 3 as taken on the line IV—IV of Fig. 3;

Fig. 5 is a fragmentary longitudinal section of one end of the delay conveyor;

Fig. 6 is a transverse section through the conveyor of Fig. 5, showing a portion of the helicoid;

Figs. 7 and 8 are elevations at right angles to each other of the expansion chamber for the material coming from the drier;

Fig. 9 is a plan view of the lower baffle of the expansion chamber;

Fig. 10 is a longitudinal, vertical section through the primary liming tank on the line X—X of Fig. 12;

Fig. 11 is a transverse vertical section through the same tank on the line XI—XI of Fig. 12; and Fig. 12 is a plan view of the same tank.

In Figs. 1 and 2 an overhead conveyor 1 of any suitable type delivers cannery waste from the canning plant to a receiving bin 2 in the feed mill. The bin has a bottom sloping downward toward the screw conveyor 3 so that the waste moves by gravity to the conveyor which is driven by a variable speed drive 4 to remove the waste from the bin in a controlled and constant supply to the primary liming tank 5.

The bottom of the tank 5 slops longitudinally downward from the rear toward the front (see Figs. 1 and 10), and slopes laterally sidewise at the front into a trap for metal, shown as a settling box 6 (Figs. 10 and 11). A chain conveyor has a plurality of paddles 7, the lower ones of which move longitudinally of the tank 5 with their tops at about the level of the water in the tank, this water level being maintained preferably by a float valve control or by hand if desired.

The rapid passage of the paddles moving through the tank causes a current of water in the direction of movement of the paddles and a reverse movement of counter-current along the sloping bottom of the tank. The turbulence caused by the paddles and the agitation as the waste falls from the conveyor will throw out any metal or other foreign material heavier than water, as for example a nut or bolt in a half-shell of grapefruit, to sink to the sloping bottom and eventually to the trap or settling box 6.

Hydrated lime is fed in dry form into the primary limer 5 at a controlled rate by a variable speed chemical feeder 6' which is driven by the screw 3 through a drive mechanism 4'. As soon as the lime falls into the water it becomes thoroughly mixed throughout the waste as the water is churned by the rush of paddles of the elevator.

The concentration of the lime in the water at this point can be regulated by a pH meter which controls the speed of flow of lime from the feeder 6, and this concentration is sufficient to neutralize a great part of the free acid entering with the waste juices to eliminate any corrosive action on the metal of the machinery during subsequent operation.

Each particle of the waste becomes thoroughly coated with a thin coat of a weak solution of lime and as the paddles carry it upward to the shredding machine 8, a quantity of the water is taken with it. The waste and water fall into the throat of the shredder and the paddles return over their track to the primary limer tank. The proportion of lime to waste leaving the limer is substantially constant but is not sufficient to cause a long continued alkaline reaction after the waste has been shredded.

In the preferred form of shredder the waste is sliced and torn into long, slender shreds, greatly increasing the surface exposed to the liquid and freeing acid and glucosides from the cells. As the waste leaves the shredder, it falls into the mixing trough 9 where the slightly limed water and the freshly cut waste are mixed vigorously and thoroughly by the inclined mixing blades 10 of the shaft 11 which also act to thrust the material along the trough. In about sixty seconds the mixture will progress about half-way along the trough and the lime from the primary limer will normally have been entirely combined with the free acids and some of the glucosides until the mass has become definitely acidic.

At this point, the additional amount of lime necessary to cause the brownish transient gel, described in my above-mentioned reissue patent, may be added to the mass by another variable chemical feeder 12, and this additional lime is immediately mixed thoroughly and quickly by the blades 10 stirring up the mass for another sixty seconds more or less while the pulp continues to move on through the mixing trough and into a delay conveyor 13.

The thorough rapid mixing of the shredded waste in the first part of the trough 9 disposes of the lime remaining from the primary liming tank 5 and the rapid mixing in the trough after the secondary liming results in quick reduction of the alkaline concentration by the action of acids and glucosides, so that the substantially neutral liquid entering the delay conveyor has little or no effect on the pectin still in the solids of the pulp.

The delay conveyor 13 is a long tank containing a low pitch helicoid of special design as shown in Figs. 5 and 6, the purpose of which is to move the treated waste slowly but continuously and allow reacidulation of the liquid to break the gel to leave a watery liquor which can be drained and pressed from the pressable solids without excessive breakage or damage to the tender fragments.

After passing through the delay conveyor, the pressable mass falls into the elevator 15. This elevator contains a perforated screen bottom allowing some of the liquid to drain off as the mass is being elevated and dumped into the top of a suitable press 16. In this press a considerable portion of the watery liquids, usually from 60 percent to 75 percent by weight, is pressed out and separated from the solids and pumped away by the pump 17 for further reconversion or for use in the primary limer or elsewhere. A pipe 18 extends from the press 16 to the pump 17 and a pipe 19 connects the elevator 15 with the pipe 18 so that the same pump serves the press and the elevator.

The pressed solids are delivered to the drying system by a conveyor 20. This drying system consists of a furnace 21, a drying drum 22, an expansion chamber 23, an elevator 24 and a cooling drum 25.

The burners of the furnace are controlled by a device which automatically raises or lowers the fuel supply to the burners according to the temperature of the drying gases passing out of the drier. If the feed is too damp, the drying gases will fall in temperature and automatically cause a thermostatically controlled diaphragm to admit more fuel to the burners and hence more heat to the drier. If the feed is drying too fast, the drying gases will rise in temperature and automatically reduce the heat in the drier. This automatic control insures a uniformly finished feed at all times without manual control. The expansion chamber 23 separates the feed out of the drying gases by a centrifugal sliding action, eliminating the damaging effect of fan blades and abrupt obstructions. The fan 26 driven by the motor 27 is mounted at the top of the cylindrical expansion chamber to cause a partial vacuum, drawing the hot gases and the partially dried hot feed through and from the drier 22 through the pipe 28 which enters tangentially of the inner periphery of the chamber so that the solids slide around the smooth interior until the weight becomes too great to be sustained by the air pressure. In the continuous movement through the conical bottom and the conveyor 29 the solids clog the outlet of the conveyor to prevent intake of air at that point. The cyclonic effect of the swirl of air is so great in the center that solids might be lifted upward if this movement were permitted in the conical bottom. The baffle 30 of the flat crossed plates just beneath the intake pipe 28 effectively prevents this air whirl from extending below the baffle.

It is desirable that the gases above the baffle shall travel at great velocity around the chamber, as this action, by centrifugal force, throws all particles of the solids against and around the walls and holds them there spinning around in an elevated position. When this mass of suspended circulating feed becomes greater than the pressure of the air can sustain, the excess portion slips down the wall below the baffle 30. In continuous operation the size of the supported circular mass remains substantially constant, and there is a continuous slipping portion moving downward all around the wall into the bottom 29.

At the top of the cylindrical expansion chamber, an axial baffle 31 of triangular flat plates breaks the cyclonic movement of the air rushing into the opening below the fan and prevents the escape of light particles that might otherwise escape through the fan.

In the central portion of the chamber, the solids lose their heated gases into the partial vacuum and some of the water is removed as these gases escape.

In the cooling drum 25 the cylindrical shell is carried by metal bands 32 riding on rollers 33 which are motor driven to cause rotation of the shell. A fan 34 driven by a motor 35 draws a current of air in at the open lower end of the shell and out at the upper end to a cyclonic separator 36 where the dust is caught and the air escapes.

Around the inner periphery of the shell is a band 37 extending inwardly several inches and running in a spiral from one end of the drum to the other. Between the turns of this spiral are a number of flat plates 38. These plates are set longitudinally and are fastened along their outer edges to the inner periphery of the drum and extend radially inward somewhat beyond the width of the spiral band. Around the axis of the drum is a cylinder 39 supported by radially disposed longitudinal plates 40. One edge of each of these plates is secured to the inner cylinder 39 and the outer edge to the spiral band 37 at the points where they meet. The plates 38 and 40 extend the whole length of the drum except about two feet at the intake end. A chute 41 delivers hot solids carried from the expansion chamber 23 by the discharge pipe 29' and elevator 24 into the upper end of the drum.

In operation the drum is set at a slight pitch and is rotated slowly at about ten revolutions per minute. The hot feed entering the revolving drum through the chute 41 falls to the bottom of the shell where it slides downward under the action of gravity and the conveying action of the spiral 37 until it is engaged by one of the plates 38. This plate acts as a shelf to lift the feed as the drum rotates and as the shelf approaches a vertical position, the feed slides off into the space between two plates 40 upon the upper surface of the cylinder 39. With continued rotation the feed slides off the blade 40 ahead of it and drops into the bottom of the shell.

When the next plate 38 reaches the fallen mass, the operation is repeated. During all this progressive movement of the feed through the drum, a current of air is drawn through the drum by the fan over the material as it lies spread out and as it tumbles from one shelf to another. Practically the entire movement of the feed is that of slipping and sliding along in spread-out sheets which are separated and re-formed at each tumbling drop from one plate to the next surface. This enables the current of air pressure to carry off any escaping moisture from the hot feed to continue the drying operation by evaporation of water and to cool the feed quickly by the refrigerating effect of the evaporation. Normal atmospheric air can be used as the drying medium even on very humid days because the entering air encounters material of a warmer than atmospheric temperature and it becomes progressively warmer as it encounters still warmer feed.

The pulp has undergone five water-removing steps after leaving the delay conveyor. The screen in the elevator 15 allows the most of the free liquid to flow away as the pulp moves to the press. The press takes out 60 percent to 75 percent of the water by mechanical pressure. In the drying drum 22 the heated pulp gives up water to the hot gases from the furnace 21. In the expansion chamber the subatmospheric pressure maintained by the fan causes expansion of the pulp and a further loss of water as the shreds swirl about in the hot gases, losing some heat as the water evaporates.

In the cooling drum 25 the gradual heating of the cool air by contact with the hot pulp so greatly increases the capacity for water-carrying that the finished product is well within the permissible limit of 10 percent that such pulp may retain without undue deterioration.

The citrus pulp stock feeds made in accordance with the preferred method outlined above and set forth more fully in my parent application Serial No. 631,072, filed November 27, 1945 now Patent No. 2,471,363, of which this is a continuation-in-part, are characterized by low bulk density, high water absorbency, a substantial content of pectin in a form which will not form insoluble compounds with calcium, and substantial freedom from pectates or the so-called pectinic acids which form insoluble compounds with calcium.

Thus the bulk density of the finished feed product in accordance with the present invention may vary from about 16½ to 18½ pounds per cubic foot and usually will be about 17½ pounds per cubic foot. The lowest bulk density of prior art and/or competitive citrus feed products of which I am aware is about 21½ pounds per cubic foot. Thus the citrus feed product of my invention represents a considerable improvement in bulk density characteristics which increase its value and usefulness for use as a feed for dairy stock.

The water absorbency of my feed product may vary from about 4 to 5 pounds of water absorbed per pound of feed and will generally run 4.8 pounds of water per pound of feed. Compared to a maximum water absorbency of 3.4 pounds of water per pound of feed for the best prior art and/or competitive citrus feed products, this represents a substantial increase. The water absorbing characteristics of feed intended for cattle and particularly milk cows is highly important and bears a direct relation to the production of milk. Hence, the greater the water absorbency of the feed the greater the production of milk.

I attribute the high water-absorbing capacity of my product in large part to the retention of the original pectin content of the citrus waste in a form which will not form insoluble compounds with calcium and to the substantial absence of insoluble compounds of calcium such as calcium pectate. This is inherent in the process by which the product is made and distinguishes my citrus feed product from similar products made by prior processes. On a dry solids basis citrus waste will usually contain from about 15 to about 18 percent of pectin. In the usual type of alkali treatment as practiced in the prior art, this pectin content is largely broken down to pectates or the so-called pectinic acids, both of which form insoluble compounds with calcium, and once dehydrated will absorb relatively little water.

The reasons for this and the reactions involved are not clearly understood. However, it is believed to be due either to excessive alkaline treatment, prolonged alkaline treatment or in some cases to the action of enzymes, which may be present with the pectins, and which act to break down the pectin under the conditions of treatment used in calcium-sensitive products such as pectinic acids. The mechanism involved appears to be a reduction of the methoxyl content of the pectin. A natural pectin contains from about 10 to about 12 percent methoxyl groups and is not sensitive to calcium. However, when the methoxyl groups are reduced to below about 7 percent, as occurs in prior methods of treatment, the ones split off form a corresponding number of carboxyl groups which can combine with metals. Thus the pectinic acids, those sensitive to calcium, are simply demethylated pectins where the methoxyl has been reduced to below about 7 percent.

In preparing the citrus feed product according to my invention, the methoxyl content of the pectin is maintained above about 7 percent, thereby avoiding any substantial formation of compounds such as pectinic acids which will form insoluble compounds with calcium. A typical analysis of a citrus feed product on a moisture-free basis according to my invention is as follows:

| | Percent |
|---|---|
| Water soluble constituents | 28.57 |
| Water soluble pectin | 2.74 |
| Water insoluble pectin | 9.67 |
| Total pectin | 12.41 |
| Methoxyl content of above pectin | 7.76 |

On a dry solids basis citrus pulp will usually contain from about 15 to about 18 percent of pectin. According to the above analysis the dehydrated product contains 12.41 percent pectin. This represents approximately a 75 percent retention of the pectin in the peel in a form which will not form insoluble compounds with calcium. Generally, the retention of pectin in such form will vary from about 70 to 80 percent of the pectin originally present in the citrus pulp.

The amount of calcium pectate and compounds which will form insoluble compounds with calcium, present in the feed product of my invention, will generally not exceed about 5 percent of the product on a dry basis and will usually be less than about 3 percent. This is a substantial improvement over the best feeds of the prior art which generally contain from about 20 to 30 percent calcium pectate.

It will thus be seen that I have provided an improved citrus feed product which is highly superior to prior feed products of this type and which is characterized by lower bulk density, higher water absorbency, greater retention of the original pectin content in a form which will not form insoluble compounds with calcium, and substantial freedom from calcium pectate, pectinic acids and the like calcium-sensitive compounds.

It will be understood that the details shown are illustrative and not restrictive, and that the right is expressly reserved to make such changes and variations as may come fairly within the scope of the claims.

I claim:

1. A substantially dry citrus pulp stock feed derivative of lime-treated citrus cannery waste comprising a mass of water-absorptive shreds of citrus waste of low moisture content, said feed having a pectin content of from about 8 to 18 percent on the moisture-free basis and containing a high ratio of pectins substantially unreacted with calcium to calcium reaction products of pectin.

2. A substantially dry citrus pulp stock feed derivative of alkaline-treated citrus cannery waste comprising a mass of water-absorptive shreds of citrus waste of low moisture content, said feed having a pectin content of from about 8 to 18 percent on the moisture-free basis and containing a high ratio of pectins substantially unreacted with calcium to calcium reaction products of pectin, said unreacted pectins having a methoxyl content above about 7 percent.

3. A substantially dry citrus pulp stock feed derivative of lime-treated citrus cannery waste comprising a mass of water-absorptive shreds of citrus waste of low moisture content, said feed having a pectin content of from about 8 to about 18 percent on the moisture-free basis and containing a high ratio of water-insoluble water-absorptive pectins to hard non-absorbent reaction products of calcium and pectin.

4. A substantially dry citrus pulp stock feed derivative of lime-treated citrus cannery waste comprising a mass of water-absorptive shreds of citrus waste of low moisture content, said feed having a bulk density of approximately 16.5 to 18.5 pounds per cubic foot and a pectin content of from 8 to 18 percent on the moisture-free basis and containing a high ratio of water-insoluble water-absorptive pectins to hard non-absorbent compounds of calcium pectate.

5. A substantially dry stock feed as defined in claim 3 in which the bulk density of the feed is approximately 17.5 pounds per cubic foot.

6. A substantially dry citrus pulp stock feed derivative of lime-treated citrus cannery waste comprising a mass of water absorptive shreds of citrus waste of low moisture content containing only a minor portion of the pectin content of the citrus waste in the converted form of insoluble compounds of calcium and pectin, said insoluble compounds of calcium and pectin being less than 5% of the mass on the moisture-free basis, and containing the major portion of the pectin content of the citrus waste substantially unreacted with calcium.

DANIEL B. VINCENT.

REFERENCES CITED

The following references are of record in the file of this patent:

UNITED STATES PATENTS

| Number | Name | Date |
|---|---|---|
| 745,074 | Roche | Nov. 24, 1903 |
| 1,501,775 | Hiller | July 15, 1924 |
| 1,977,644 | Paxton | Oct. 23, 1934 |
| 1,991,242 | Cole et al. | Feb. 12, 1935 |
| 2,187,501 | Lissauer | Jan. 16, 1940 |
| 2,215,944 | Vincent | Sept. 24, 1940 |
| 2,261,224 | Christensen | Nov. 4, 1941 |
| 2,386,052 | Lundy | Oct. 2, 1945 |
| 2,471,363 | Vincent | May 24, 1949 |

FOREIGN PATENTS

| Number | Country | Date |
|---|---|---|
| 5,658 | Netherlands | Jan. 11, 1921 |